UNITED STATES PATENT OFFICE.

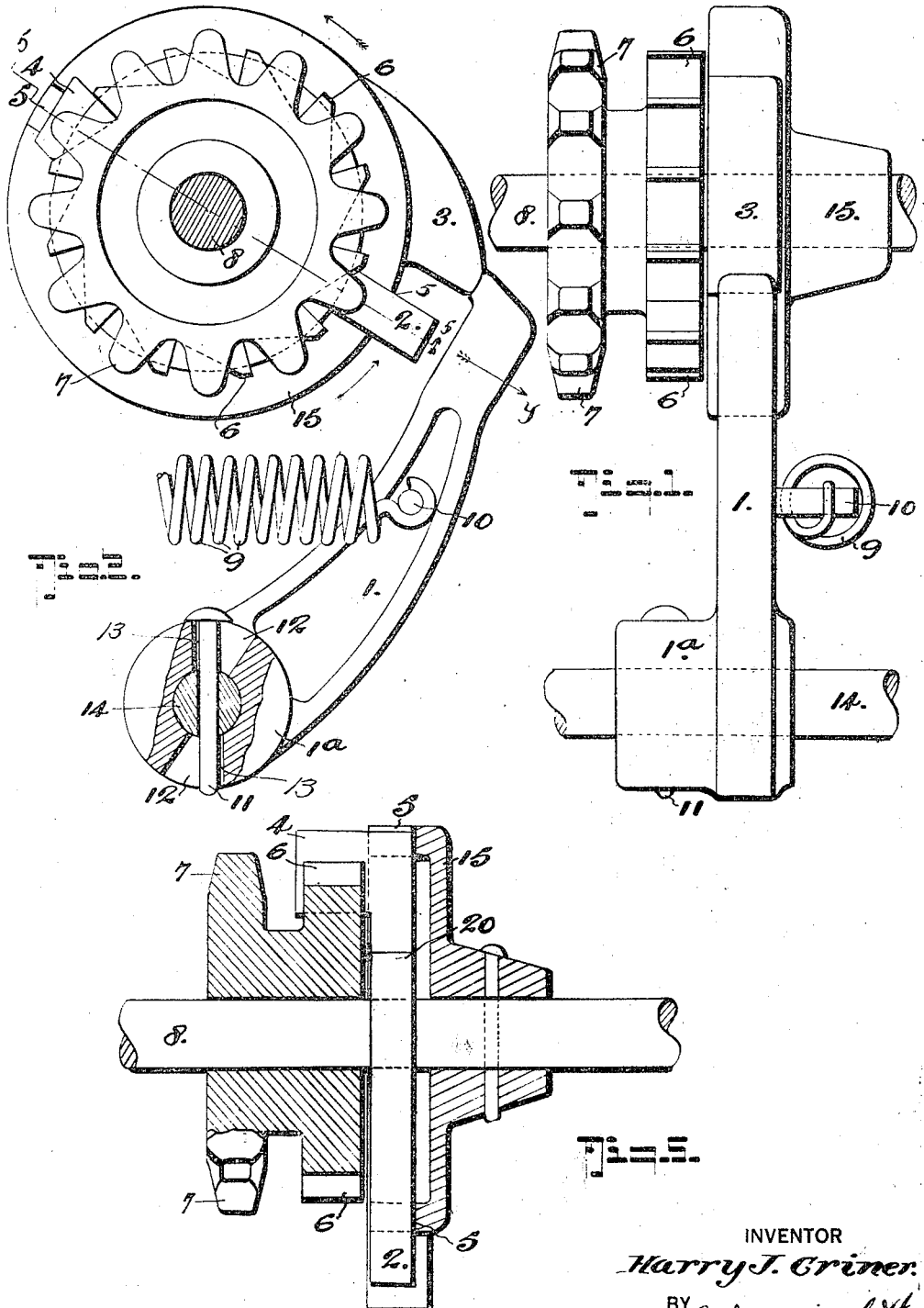

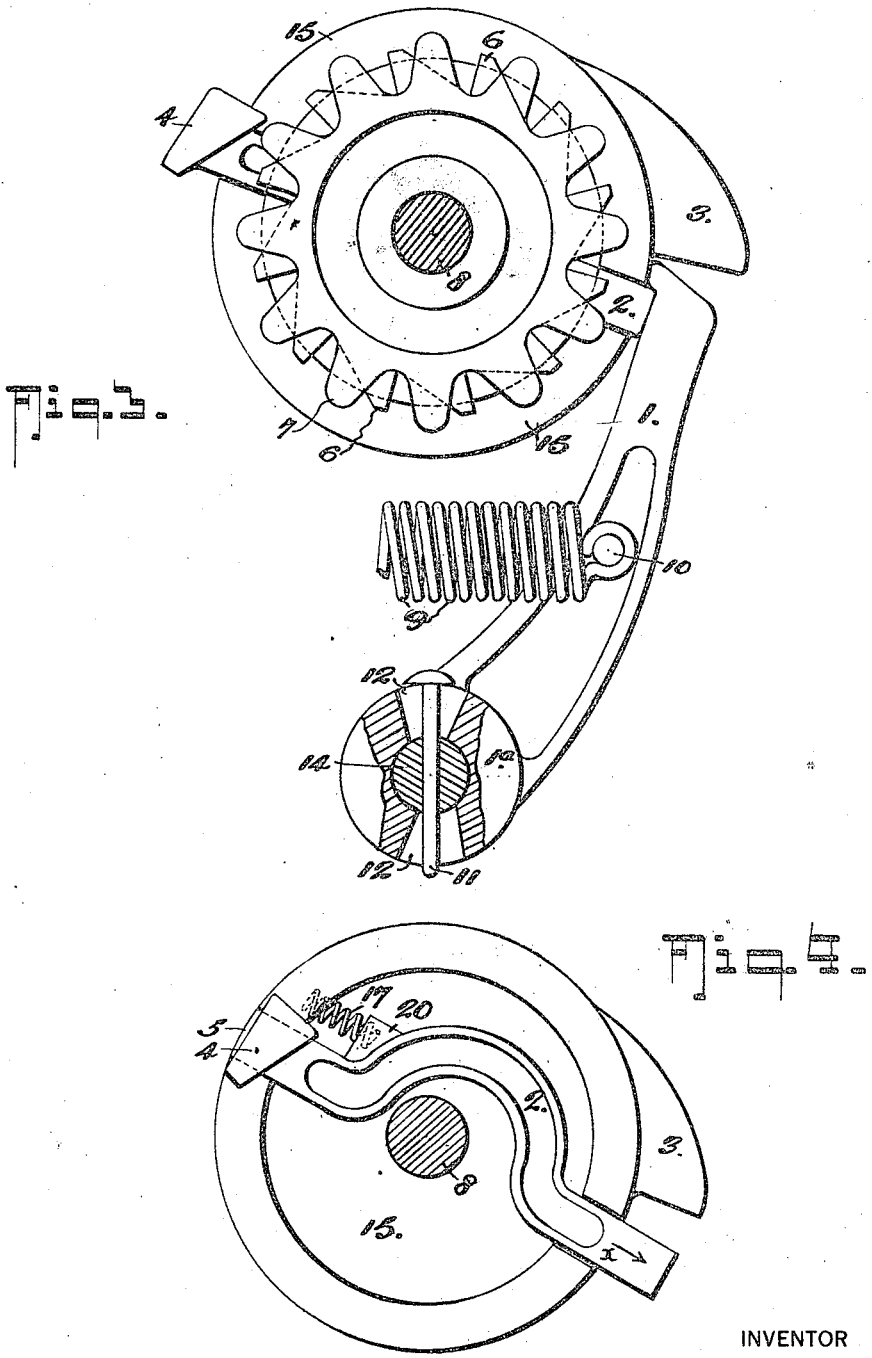

HARRY J. CRINER, OF BURLINGTON, IOWA, ASSIGNOR TO HAMPTON PLANTER COMPANY, A CORPORATION.

CLUTCH MECHANISM.

1,269,057.

Specification of Letters Patent.  Patented June 11, 1918.

Application filed May 4, 1917.   Serial No. 166,395.

*To all whom it may concern:*

Be it known that I, HARRY J. CRINER, a citizen of the United States, residing at Burlington, in the county of Des Moines and State of Iowa, have invented a new and Improved Clutch Mechanism, of which the following is a specification.

This invention has reference to improvements in clutch mechanisms of that type in which motion is intermittently transmitted from a driven shaft to another shaft, and my said invention is more especially designed for providing an improved clutch more especially adapted for use in connection with check row corn planters for actuating the seed plate shaft when geared up with the seed or fertilizer devices.

My invention primarily has for its purpose to provide a clutch mechanism of the character stated in which the parts are constructed to present a compact and inexpensive clutch, designed in the simplest form possible with the coacting members so combined that it is impossible to fail to do its work.

Another object of my invention is to provide an improved clutch mechanism in which the clutching and releasing operations are governed by a single shiftable member or dog.

With other objects in view and hereinafter explained, my improved clutch mechanism embodies the peculiar features of construction and novel arrangement of the parts set out in the following detailed description, specifically pointed out in the appended claims and illustrated in the accompanying drawings, in which:

Figure 1 is a plan view of my improved clutch mechanism.

Fig. 2 is a side elevation thereof that shows the transmission or sprocket drive clutched with the plate shaft.

Fig. 3 is a similar view, the parts being shown positioned to permit the sprocket drive to run loose on the plate shaft.

Fig. 4 is a face view of the clutch dog and the casing that turns with the plate shaft, the dog being positioned as in Fig. 2, and Fig. 5 is a cross section of the clutch device taken on the line 5—5 on Fig. 2, the clutch dog being shown as in Fig. 2.

In the drawings, the common parts of a planter are omitted since they, *per se*, form no part of my invention, it being understood that in the practical application thereof, that is combined with the fork or check row shaft and the plate shaft, as indicated in the drawings, the check row shaft actuates the valve devices that hold the grain charges in the leg or boot of the planter and the plate shaft is geared up with the plate dropping device in the seed boxes in the usual manner, for example as indicated in Patent No. 883,014, March 24, 1908.

In the drawings, 8 designates the plate shaft to which motion in the forward direction is imparted as the planter is drawn along the field, during the operation of check moving, and 14 designates the fork shaft to which motion is intermittently applied by the check wire in the usual manner as will be hereinafter referred to.

1 designates what I term the clutch arm and it includes a hub portion 1ᵃ mounted on the fork shaft 14 on which it has a limited, rockable motion by reason of a pair of oppositely disposed slots 12—12, formed in the said hub and a pin or key 11 that is tightly driven through the said fork shaft, as is clearly shown in Fig. 2.

15 designates a casing that includes a hub, in practice, fixedly attached to the plate shaft 8 to turn therewith and an annular flange that has diammetrically opposite grooves 5—5.

2 designates a clutch dog that extends transversely of the open side of the casing with its ends guided in the grooves 5—5, as is best shown in Fig. 4, by reference to which it will be noticed the dog is arched to straddle the shaft 8 and has, at one end, a laterally projected tapered head or pawl 4, the purpose of which will presently appear.

A spring 17, connected at one end to the casing 15 and having the other end bearing against a socketed heel 20 on the dog 2, tends to normally move the dog to its outer or clutching position, see arrow *x*.

3 designates an eccentric boss on the peripheral face of the casing that coöperates with the outer end of the clutch arm 1 which is held in tight engagement with the boss 3 by a spring 9 secured at one end to a pin 10, projected laterally from the arm 1, and the other end to a fixed member on the planter.

7 designates the sprocket drive to which motion is applied by a chain transmission that constitutes a part of the planter mechanism and 6 designates the clutch gear or ratchet that coöperates with the clutch dog 2, as shown. Gear 6 and the sprocket drive are integral, being cast together to normally run loosely on the plate shaft 8.

The manner in which my improved clutch operates, is best explained as follows:

Assuming the parts to be at a normal position, that is with the clutch arm 1 in engagement with the dog 2, to hold the dog released from clutch gear or ratchet 6, as shown in Fig. 3, as the planter starts forward the clutch remains stationary, the seed plate shaft 8 idle, while the sprocket 7 and clutch gear 6 now freely turn on the said shaft 8.

As soon as a button on the check wire starts the fork on the shaft 14 backward, and just as the fork reaches a vertical position, the turning of the fork shaft 14 operates to effect the opening of the seed valve in the leg or boot of the planter, letting the grain, held in the said leg, pass into the ground; and as the fork still passes on backward, the pin 11 on the fork shaft 14, bears against the walls 13 of the slots 12 and thereby pushes the clutch arm 1 out from engagement with the clutch dog 2, see arrow $y$, and the said dog 2, being now released by the pressure spring 17, is forced outwardly, bringing its pawl 4 into mesh with the clutch gear 6, and thus locking the drive 7 to turn with the plate shaft 8 which then actuates the seed or dropping plates, in the usual way.

Now as the button on the wire passes from the fork, and the latter is thereby released, the said fork is carried back into position by the spring 9 on the clutch arm 1, to the original starting point, at the same time closing the valves in the planter boots and leaving the nose of the arm 1 as resting on the casing flange, where it remains until the eccentric boss 3 meets it, when the said arm raises and as the end of the boss 3 passes thereunder, the said arm 3 drops and under its spring force strikes the dog 2 and shifts it out of mesh with the clutch gear 6, thus throwing the said gear and the drive 7 out of clutch with the shaft 8. The aforesaid operation is repeated whenever a check wire button engages the fork on the shaft 14.

From the foregoing, taken in connection with the drawings, the complete arrangement, the manner of operation and the advantages of my improved clutch device will be readily apparent to those skilled in the art to which my present invention relates.

What I claim is:

1. A clutch comprising the following elements in combination; a rotatable shaft, and an oscillatable shaft, a continuously rotating driver loosely mounted on the rotatable shaft, a clutch device for connecting the said rotatable shaft and the continuously rotatable driver, an arm loosely mounted on the oscillatable shaft spring moved in one direction, and coöperative connections on the oscillatable shaft and the arm, for swinging the arm out against the tension of its spring, said clutch device including a spring shifted dog, movable with the rotatable shaft, and adapted to be moved out of the clutched position by the swinging arm, and means movable with the rotatable shaft and for holding the swinging arm out to the inoperative position and under tension of its spring.

2. In a clutch mechanism for corn planting machines, the combination with the plate shaft and the fork shaft; of a drive gear, loosely mounted on the plate shaft, a casing including an annular flange, rotatable with the plate shaft, a clutch dog shiftably mounted on the casing, said drive gear including a ratchet member, said dog including a pawl, means tending to normally move the dog to engage its pawl with the said ratchet member, an arm mounted on the fork shaft and having a limited rockable motion on the shaft, means tending to normally swing the arm against the dog for holding the said dog to its inoperative position and the means actuated by the rocking motion of the fork shaft to disengage the arm from the clutch dog and for holding the said arm to such position at times.

3. In a clutch device of the character stated, the combination with the plate shaft, and the fork shaft, a constantly rotating driver loosely mounted on the plate shaft, said driver including a ratchet gear, a casing that turns with the said plate shaft, a dog transversely and slidably held on the casing, said dog including a pawl, means tending to normally move the dog to engage its pawl with the ratchet gear on the driver, said casing having an eccentric boss on its peripheral edge, an arm including a hub loosely mounted on the fork shaft, said hub having oppositely disposed tapered slots, a key pin on the fork shaft whose ends extend into the said slots for engaging the walls of the said slots, to swing the arm in one direction, a spring connected to the arm for swinging it in the opposite direction to engage the clutch dog to slide said dog out of its clutching position and for holding the free end of the arm in engagement with the casing flange for being engaged by the eccentric boss on the said flange.

HARRY J. CRINER.